United States Patent
Adams et al.

(10) Patent No.: US 6,823,060 B1
(45) Date of Patent: Nov. 23, 2004

(54) METHOD FOR IMPLEMENTING SERVICE LOGIC VIA DATABASE TABLE TRANSVERSALS

(75) Inventors: John Adams, Barnegat Light, NJ (US); Sean K. O'Donnell, Point Pleasant, NJ (US); Neil A. Ostroff, Kirkland, WA (US)

(73) Assignees: AT&T Corp., New York, NY (US); AT&T Wireless Services Inc., Redmond, WA (US)

(*) Notice: Subject to any disclaimer, the term of this patent is extended or adjusted under 35 U.S.C. 154(b) by 0 days.

(21) Appl. No.: 09/406,278

(22) Filed: Sep. 24, 1999

(51) Int. Cl.$^7$ ............................................. H04M 7/00

(52) U.S. Cl. ................... 379/229; 379/221.09; 379/230

(58) Field of Search ...................... 379/112.09, 216.01, 379/221.15, 355.05, 355.06, 355.07, 355.08, 355.09, 901, 114.29, 221.09, 229, 230

(56) References Cited

U.S. PATENT DOCUMENTS

| | | | | | |
|---|---|---|---|---|---|
| 4,757,267 A | * | 7/1988 | Riskin | .................... | 379/114.24 |
| 5,136,636 A | * | 8/1992 | Wegrzynowicz | ........ | 379/221.01 |
| 5,291,550 A | * | 3/1994 | Levy et al. | .................. | 379/242 |
| 5,588,048 A | * | 12/1996 | Neville | .................. | 379/127.01 |
| 5,805,688 A | * | 9/1998 | Gillespie et al. | ........ | 379/221.08 |
| 6,058,179 A | * | 5/2000 | Shaffer et al. | ......... | 379/220.01 |
| 6,249,815 B1 | * | 6/2001 | Foladare et al. | ............ | 709/223 |

* cited by examiner

Primary Examiner—Bing Q. Bui

(57) ABSTRACT

A method and apparatus for translating a first number (e.g., a number dialed by a telephone subscriber) to a second number (referred to as a routing number) is disclosed. An example of an apparatus in accordance with the present invention includes two broad functional components: 1) tables of translation information stored within a database and 2) application software. Upon receiving a query requesting the translation of a dialed number to a routing number, the application software uses information within the received query to query the tables of translation information in order to find the correct routing number. The routing number is then sent to the requester.

10 Claims, 2 Drawing Sheets

METHOD FOR IMPLEMENTING SERVICE
LOGIC VIA DATABASE TABLE
TRANSVERSALS

BACKGROUND

The present invention relates to translating a first number to a second number. More specifically, the present invention relates to a method and apparatus for translating a first number to a second number by querying the contents of tables within a database.

A majority of the new and enhanced telephone services provided by telecommunications service providers depend principally upon the translation of a number dialed by a subscriber into a logically derived target telephone number (also referred to as a "routing number"). The number of steps required to determine the target telephone number which corresponds to a dialed number may vary depending upon the service provided. For example, if the target telephone number may be determined based solely upon one variable associated with the dialed number (i.e., the number dialed the geographic location where the telephone call originated, the number assigned to the telephone used to dial the number, the time of day a particular number is dialed, or the area code of the dialed number), the target telephone number may be determined after the single step of identifying this one variable. However, if the corresponding target telephone number varies depending upon the specific combination of more than one variable associated with the dialed number (i.e., the area code of the dialed number, the time of day the number is dialed, and whether the caller is among the first 100 people to dial the number), multiple steps may be required to identify each of these variables and determine the corresponding target telephone number.

One known method for translating a dialed number to a corresponding target telephone number entails executing the appropriate translation steps as computer program code segments (software) known as "service logic". For example when a subscriber dials an 800 telephone number, the switch servicing this dialed number sends a query to a database such as a network control processor (NCP). The NCP then executes service logic software to determine the target telephone number which corresponds to the dialed 800 number and sends the determined target telephone number to the switch. The switch then uses the target telephone number received from the NCP (rather than the 800 telephone number originally dialed by the subscriber) to complete the subscriber's telephone call.

One of the drawbacks of translating numbers using service logic software relates to the fact that the software must usually be specifically tailored for a particular telephone service. If a customer wishes to modify a telephone service, the service logic software which implements that service will usually need to be rewritten and the rewritten software will most likely need to be tested and debugged. The amount of time required to modify/test the service logic software and implement the service may be unacceptably longer than the amount of time the customer desires.

Thus, a need exists for a technique which solves the above described-problems.

SUMMARY OF THE INVENTION

The present invention provides a method and apparatus for translating a first number (e.g., a number dialed by a telephone subscriber) to a second number (referred to as a routing number). An example of an apparatus in accordance with the present invention includes two broad functional components: 1) tables of translation information stored within a database and 2) application software. Upon receiving a query requesting the translation of a dialed number to a routing number, the application software uses information within the received query to query the tables of translation information in order to find the correct routing number. The routing number is then sent to the requester.

DETAILED DESCRIPTION

The present invention implements steps necessary to translate one number to another number by querying the contents of tables within a database rather than by executing computer program code segments (software). In one embodiment of the present invention, a mobile switching center (MSC) queries a service control point (SCP) for call routing information when the MSC's dialing plan indicates that a subscriber has dialed a number which requires translation to a corresponding target telephone number (also referred to herein as a "routing number"). Each query includes information which can be used to aid in the number translation process. Examples of this information include the following the digits dialed, the subscriber's wireless telephone mobile identification number (MIN), the subscriber's wireless telephone electronic serial number (ESN), and the MSC's identifier code (MSCID). The SCP uses the information within the query to translate the dialed number to a routing number by querying tables within a database. The SCP then sends the routing number to the MSC. The MSC may then use the routing number to route the subscriber's call. In accordance with the present invention the process of creating or modifying a service entails adding or deleting records within tables included within the database.

Figure 1:
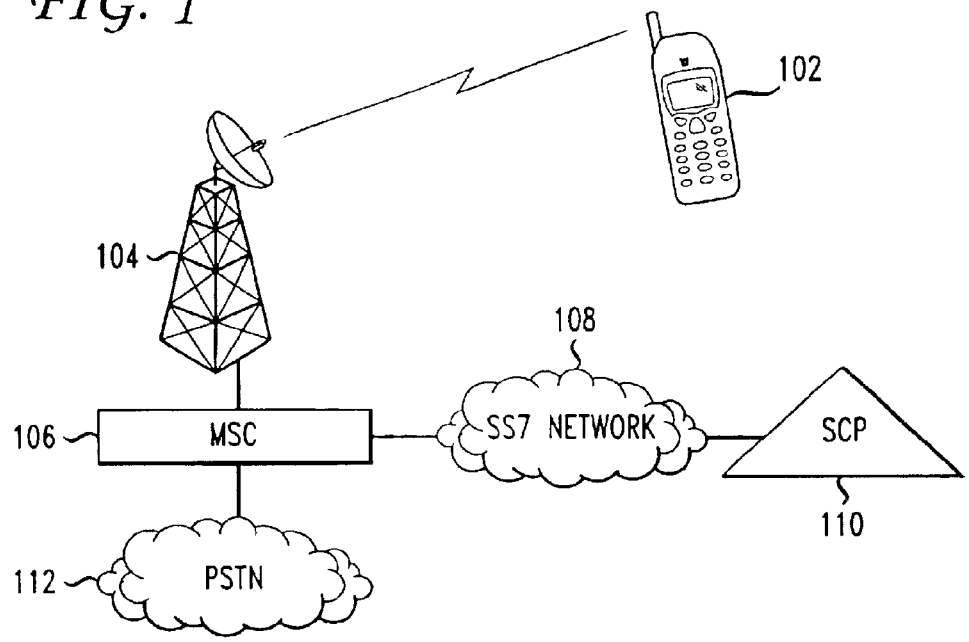
FIG. 1 is a block diagram of a system suitable for practicing an embodiment of the present invention.

FIG. 1 is a block diagram of a system suitable for practicing an embodiment of the present invention. In FIG. 1, a MSC 106 is adapted to be connected to a cell site (also referred to herein as a "base station") 104, an SS7 Network 108, and a public switched telephone network (PSTN) 112. MSC 106 is a known device which makes connections from mobile units such as wireless telephones to called parties through the PSTN.

Base station 104 is adapted for two-way wireless communication with mobile units such as wireless telephones within the geographic area covered by base station 104. A wireless telephone 102 is illustrated as currently located within the geographic area covered by base station 104. Wireless telephone 102 may be for example, an Ericsson DH318.

A service control point (SCP) 110 is adapted to be connected to SS7 network 108. SCP 110 to is a known device which, in general terms, is a database of network information which can be accessed by network nodes such as MSCs. SCP 110 has been modified in accordance with the present invention. These modifications will be discussed in greater detail below with reference to FIG. 2. Queries sent from MSC 106 to SCP 110 via SS7 network 108 and responses sent from SCP 110 to MSC 106 via SS7 network 108 are encoded in accordance with a protocol such as Interim Standard-41 (IS-41). IS-41 is a messaging protocol built upon SS7 Transaction Capability Application Part (TCAP).

Figure 2:
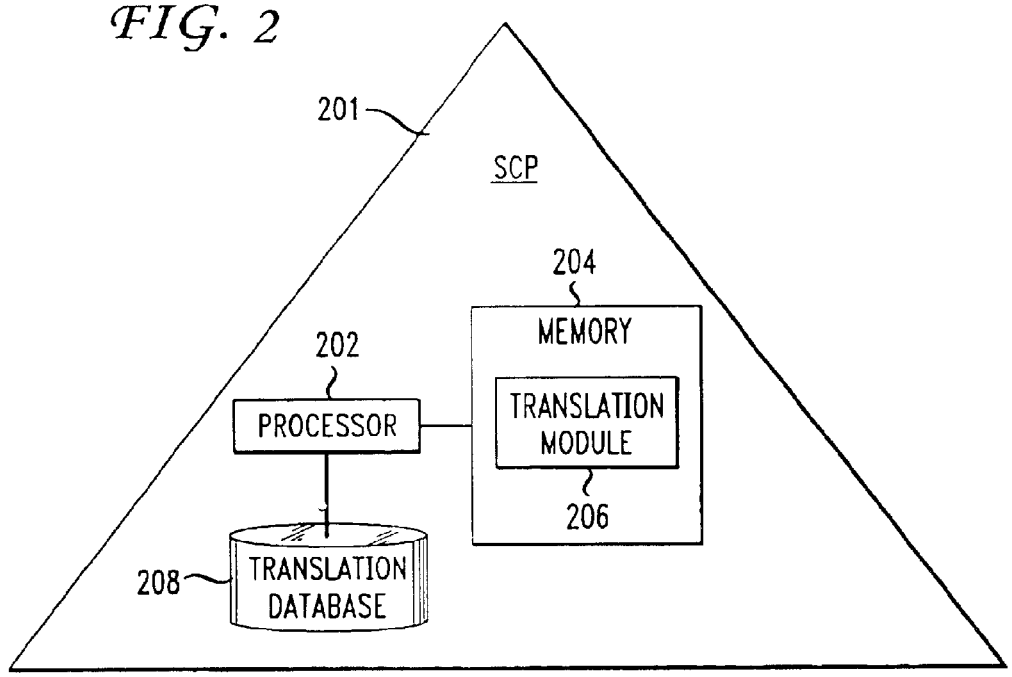
FIG. 2 is a block diagram of a service control point (SCP) in accordance with an embodiment of the present invention.

The SCP of the present invention translates subscriber dialed digits to routing numbers. An example of an SCP in accordance with the present invention includes two broad functional components: 1) tables of translation information stored within a database and 2) application software that queries the translation information in order to find correct routing numbers. FIG. 2 is a block diagram of a SCP in accordance with an embodiment of the present invention. In FIG. 2, an SCP 201 comprises a processor 202 adapted to be connected to a computer readable memory segment 204 and a translation database (TDB) 208. Computer readable memory segment 204 stores computer program code segments which, when executed by processor 202, implement the main functionality of this embodiment of the invention. These computer program code segments are stored within a translation module 206. Although in this embodiment of the invention the computer program code segments are shown in one module, it can be appreciated that this module can be further separated into more modules and still fall within the scope of the invention. The operation of translation module 206 will be described below with reference to FIG. 3.

TDB 208 may be (for example) an Oracle 7, available from Oracle Corp., an Informix available from Informix; a DB 2, available from the IBM Corporation, or a Sybase, available from Sybase Corporation. TDB 208 includes one or more tables. Each table includes one or more records. Each record may comprise one or more fields. As described in greater detail below, information stored within the database table records is used to translate numbers in accordance with the present invention.

In one embodiment of the present invention, TDB 208 comprises a set of five tables. The Universal Dialing Plan (UDP) table maps dialed digits into one of the other database tables. The variable primarily used to search this table (the "primary key" of this table) is the dialed digits. The Custom Dialing Plan (CDP) table is used to implement private dialing features based on the dialed digits and the MIN of the caller. The primary key of this table is reference—dialed digits. The reference is a string that identifies a record as belonging to a particular service. The reference is used to implement table traversals which are explained below. The Mobile Switching Center Identification (MSCID) table provides call screening based on the MSC from which a call originates. The primary key of this table is reference—MSCID. The Mobile Identification Number (MIN) table provides further call screening based on the MIN of the wireless telephone used to make a call. The primary key of this table is reference—MIN. The Deny (DNY) table contains call denial reasons and announcement indicators. The primary key of this table is reference. Although this embodiment of the invention and some of the examples described below are based upon a translation database comprising five tables, the method of the present invention may also be implemented using a greater or lesser number of tables. The function of the above-described five tables will be described in greater detail below.

The first step in implementing a telecommunications service in accordance with the present invention may entail using the following queries to identify the information which should be stored in the appropriate database table records:

1. What digits does a customer dial to access this service? There may be exactly one dialed digit sequence or a range of digit sequences that access the service.
2. Are the dialed digits enough to find a routing number, or does the service need other indexed information as found in the MSCID, the MIN, or a custom dialing plan? If so, the service may need a record provisioned in the MSCID, MIN, or CDP tables.
3. In some instances, should service be denied to a dialed digits value even though the value is in the service range?
4. Should the service log each time a query traverses its table information?
5. Should the service keep pegs counts when a query traverses its table information? If a peg count is needed, a peg identification (ID) may need to be selected. A service can have its own peg ID or can share a peg ID with similar service(s), which should be measured together. These peg IDs may be used to accomplish usage measurements.
6. Does the service need a new security ID or does it share a security ID already in use? (The security ID is used for an external, web-based, provisioning interface to the translation information.)

Once the appropriate information has been identified and stored within the appropriate database table records, the service may be implemented. In the context of the above-described embodiment which includes five database tables, the implementation process begins when the SCP receives a query such as an IS-41 B+ OriginationRequest INVOKE message via the SS7 network from an MSC. The received query may include the digits dialed by a wireless telephone subscriber. The SCP then first searches the UDP table for a record using the digits dialed as the search key. If a match is found (either an exact match, a range match, or a pattern match (each described in greater detail below)), the SCP begins a traversal of the TDB using the UDP record as the current record. In general, a traversal is done by continually using the "next_tbl" and "next_ref" fields from the current record to point to another record in another table. This next record then points to another record and so on. The "next_tbl" field specifies the next table to search (e.g., MSCID, CDP, DNY, or MIN). The "next_ref" field is combined with the appropriate datum from the translation query (e.g., MSCID, dialed digits, or MIN) to create a value with which to search the next table. A traversal ends if the SCP encounters a null "next_tbl" or "next_ref" field or if the SCP reaches the DNY table. When either of these conditions occur, the translation is terminated and the "routing digits" value contained in the current record is used as the routing number. Once the routing number is identified from within a record, the SCP sends an OriginationRequest RETURN RESULT response message (which includes the routing number) to the MSC via the SS7 network.

As an example, consider the implementation of a private dialing plan for three employees of ABC Co. Employees can call each other on their wireless telephones using 4-digit numbers instead of the full MIN. Specific employee information is included within the following table:

| Employee | MIN of Employee Phone | Assigned 4-Digit Private Dialing Plan Number |
| --- | --- | --- |
| 1 | (732)555-1010 | 1001 |
| 2 | (732)555-2020 | 1002 |
| 3 | (732)555-3030 | 1003 |

Implementation of this service would require the following:

One entry in the UDP table, using range matching on dialed digits "1001" to "1003." This entry would reference the MIN table.

Four entries in the MIN screening table: three representing the three employees, and one to direct all other callers to the DNY table.

Three entries in the CDP table. Each entry mapping the dialed digits to MIN's of the employees.

One entry in the DNY table for all other callers.

The following table illustrates the table traversal when Employee 1 calls Employee 2.

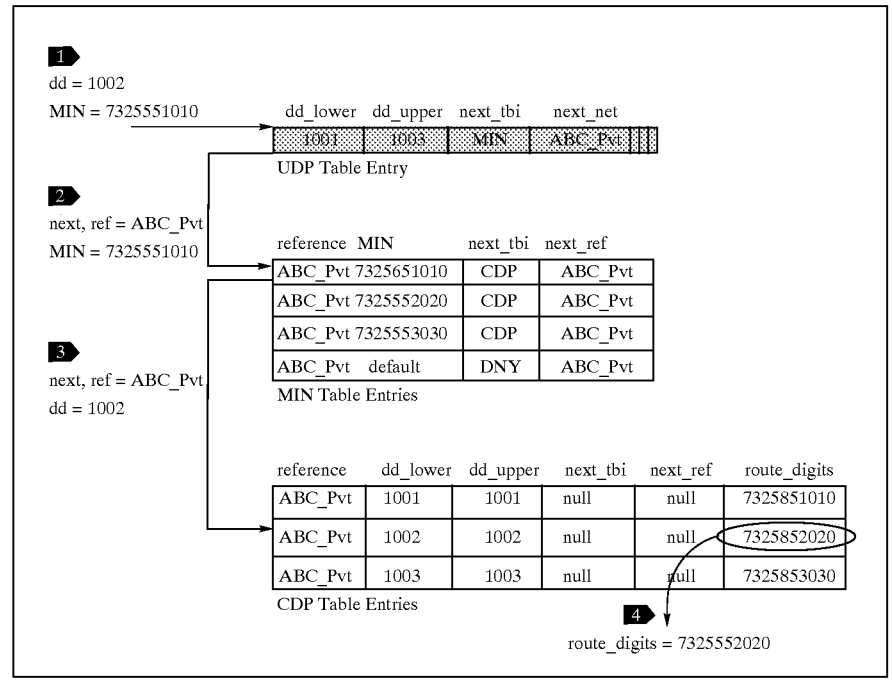

In step 1, illustrated in the above table, the SCP receives a query which includes dialed digits (dd) of 1002 and a MIN of 7325551010. The SCP executes software to search for an entry in the UDP table based on the dialed digits. The selected UDP record (indicated with an arrow in step 1) points to the MIN table because the entry below the "next_tbl" heading (also referred to as the "next_tbl field") is "MIN." In addition, the selected UDP record points to MIN table records which include an "ABC_Pvt" reference because the "next_ref field" is "ABC_Pvt."

In step 2, the SCP queries the MIN table using the next_ref value ("ABC_Pvt") from the UDP record and the MIN ("7325551010") from the received query. As illustrated, four MIN records include the next_ref value obtained from the UDP record in step 1. The MIN record (indicated with an arrow from the UDP Table Entry) which includes a field having the desired MIN points to the CDP table because the "next_tbl field" is "CDP."

In step 3, illustrated above, the SCP queries the CDP table using the next_ref value ("ABC_Pvt") from the MIN record and the dialed digits ("1002") from the received query. As illustrated above three CDP records include the next_ref value obtained from the MIN record in step 2. The CDP record (indicated with an arrow from the MIN Table Entry) which includes a field having the desired dialed digits contains a value in the "route_digits field" (the routing number) and null values in the "next_tbl" and "next_ref" fields. In step 4, the SCP returns the routing number to the MSC. The MSC then routes the call from employee 1 to employee 2.

In another example, the present invention may be used to implement a service entitled "#TRAFFIC." #TRAFFIC is a subscriber service that may appeal to the motoring wireless telephone subscriber who desires highly specialized traffic reports concerning the geographic area in which they are currently traveling. This example service makes use of the fact that a subscriber is localized (somewhat) by the MSC that is currently handling this call attempt. Thus, if we know where the call is originating from (by identifying the MSC from which the call originated), it is possible to provide precision traffic and road condition reports relative to that MSC.

The #TRAFFIC service is invoked when a subscriber dials the digits "#8723342" which spells out "#TRAFFIC" on their wireless telephone's dialing pad. One must assume that the local MISC that is gathering these digits was provisioned to provide OriginationRequest triggering. In general terms, OriginationRequest triggering is the ability of the switch to form an OriginationRequest message and send the message to another network or device such as an SCP. Upon receiving the dialed digits, the MSC (uniquely identified by MSCID and Market ID) sends an OriginationRequest query (including the dialed digits) to the SCP for translation treatment. The SCP then determines the routing number which should be used by the MSC to provide #TRAFFIC service for this subscriber.

The #TRAFFIC example utilizes the following three out of the five above-described SCP tables to translate this OriginationRequest: the UDP table, the MSCID table, and the DNY table. In particular, implementing #TRAFFIC in accordance with this example requires one record in the UDP table, five records in the MSCID table, and one record in the DNY table.

Prior to implementing this service, records are created within the previously mentioned tables. Table 1-1 illustrates the information stored in each field of the UDP table record for this #TRAFFIC example.

TABLE 1-1

UDP Table Record for #TRAFFIC Example Service

| UDP FIELD | Value for Field |
|---|---|
| Dialed Digits Lower | #8723342 |
| Dialed Digits Upper | #8723342 |
| Next Table | MSCID |
| Next Ref | traff |
| Route Digits | NULL |
| Peg ID | NULL |

When the SCP traverses the UDP table with dialed digits #8723342, it finds a match on this particular record because the "Dialed Digits Lower" field value and the "Dialed Digits Upper" field value are identical and equal to #8723342. The "Dialed Digits Lower" field value and the "Dialed Digits Upper" field value define the upper and lower range for the dialed digits. Furthermore, the "Next Table" field value specifies the MSCID as the next table which should be searched. The "Next Ref" field in the UDP table determines that records with "traff" in the "Reference" field will be searched in the MSCID table. The "Route Digits" field value in this record is "NULL" (indicating no value is included within this field) since the routing is performed ultimately by the contents of the MSCID table's matching records. Note that, in this example, the "Peg-ID" is "NULL." Thus, no peg counting will be accomplished in this record. While peg counting (which is the basis for charging for this service) is required, different newspapers may be contracted to provide geographic traffic information, and thus the need to uniquely identify peg counts may be deferred to take place in the MSCID table.

In this #TRAFFIC example, four of the five MSCID records correspond to one of the four geographic areas of concern, North, South, East, and West. This example also assumes that four MSCs exist in this particular metropolitan area and are located in the sectors where the traffic reports are desired. Clearly, more or fewer regions can be provisioned. Table 1-2, Table 1-3, Table 1-4 and Table 1-5 below illustrate the information stored in each field of the four MSCID records.

TABLE 1-2

MSCID Table First (or North) Record for #TRAFFIC Example Service

| MSC FIELD | Value for Field |
|---|---|
| Reference | traff |
| Market_ID | 1234 |
| MSCID | 111 |
| Next Table | NULL |
| Next Ref | NULL |
| Routing Digits | 2035552222 |

TABLE 1-3

MSCID Table Second (or South) Record for #TRAFFIC Example Service

| MSC Field | Value for Field |
|---|---|
| Reference | traff |
| Market_ID | 1234 |
| MSCID | 222 |
| Next Table | NULL |
| Next Ref | NULL |
| Routing Digits | 2035552222 |

TABLE 1-4

MSCID Table Third (or East) Record for #TRAFFIC Example Service

| MSC Field | Value for Field |
|---|---|
| Reference | traff |
| Market_ID | 1234 |
| MSCID | 333 |
| Next Table | NULL |
| Next Ref | NULL |
| Routing Digits | 203555333 |

TABLE 1-5

MSCID Table Fourth (or West) Record for #TRAFFIC Example Service

| MSC Field | Value for Field |
|---|---|
| Reference | traff |
| Market_ID | 1234 |
| MSCID | 444 |
| Next Table | NULL |
| Next Ref | NULL |
| Routing Digits | 203555444 |

Inspecting the preceding four records, one can see that any #TRAFFIC subscriber who originates a call to #TRAFFIC while being served by any of the four MSCs with MSCIDs of 111, 222, 333, and 444 is respectively routed to one of the following four telephone numbers: 2035551111, 2035552222, 2035553333, or 2035554444. Once a call is routed to one of these numbers, a recording plays traffic and road conditions specific to the geographic area from which the call originated.

If, by any chance, the #TRAFFIC subscriber places their call while being served by any switch other than the four MSCs detailed previously, the DNY table may come into play. In this case, an additional record in the MSCID table is required since the subscriber may have placed this call from an area where no #TRAFFIC "sponsor" is available. In this last "default" case, the MSCID table record to handle this would be inserted after the preceding four and would be matched only when none of the preceding four MSCID records are matched. This default MSCID record is shown below in Table 1-6.

TABLE 1-6

MSCID Table Default (no Match) Record for #TRAFFIC Example Service

| MSC Field | Value for Field |
|---|---|
| Reference | traff |
| Market_ID | default |
| Switch | default |
| Next Table | DNY |
| Next Ref | no traff |
| Routing Digits | NULL |

As illustrated in Table 1-6, the "Next Table" field points to the DNY table. Finally, a single record must be provisioned in the DNY table to perform final routing treatment for those #TRAFFIC calls that cannot be serviced. The information stored within this record is illustrated in Table 1-7 below.

TABLE 1-7

Default (or No Match) DNY Table Record for #TRAFFIC Example Service

| MSC Field | Value for Field |
|---|---|
| Reference | traff |
| Deny Reason | 3 |
| MSCID | 15D18B |

If the SCP reaches the above DNY table record, the SCP instructs the MSC by returning deny access reason #3, along with announcement list 15D18B (a list of the recorded announcements to be played to the subscriber). Thus, all cases of telephone calls which might be received by the #TRAFFIC service are addressed by the creation of the previously described records within these three tables.

In yet another example which illustrates the method of the present invention, consider a service entitled "#TOW." This service routes a #TOW (#869) call to a highway towing service specified for the location of the MSC from which the call originates. Implementing this service in accordance with this example requires one record in the UDP table, multiple records in the MSCID table, and one record in the DNY table. The information stored within the records of each of these tables is detailed in the following paragraphs.

In this example, the implementation of this service begins in the UDP table. The information stored within the fields of the UDP table record for the #TOW example is illustrated in Table 1-8.

TABLE 1-8

UDP Table Record Information for the #TOW Example Service

| UDP Field | Value for field |
|---|---|
| Dialed Digits Lower | #869 |
| Dialed Digits Upper | #869 |
| Next Table | MSCID |
| Next Reference | TOWlocate |

As illustrated in the record of Table 1-8, each received query which includes "#869" is directed to the MSCID table by the "Next Table" field value. The "Next Reference" field in the UDP table determines that records with "TOWlocate" in the "Reference" field will be searched in the MSCID table. The fields for "Dilated Digits Lower" and "Dilated Digits Upper" are the same because this service is only invoked when a single number, #869, is dialed by a subscriber. If this service was invoked for a range of numbers, the lower and upper numbers of the range would be entered in the two fields.

After the UDP table, the translation process for this example proceeds to the MSCID table. The MSCID table contains one record for each MSC participating in this service. In most cases, a record would identify the routing digits for the towing service closest to the MSC from which the call originated.

TABLE 1-9

MSCID Table Record Information for the #TOW Example Service

| MSC Field | Value for field |
|---|---|
| Reference | TOWlocate |
| Market ID | 136 |

TABLE 1-9-continued

MSCID Table Record Information for the #TOW Example Service

| MSC Field | Value for field |
|---|---|
| MSCID | 4 |
| Next Table | NULL |
| Next Reference | NULL |
| Routing Digits | Whatever number identifies the local tow service - for example 4145552869 |

As illustrated in Table 1-9, calls originating from an MSC with MSCID "4" will be forwarded to the telephone number "4145552869" by the "Routing Digits" field. If no #TOW service is available in the area from which the call was made, instead of a "Routing Digits" entry, the service would want to return a "service denied" message. To do this, the MSCID table record would point to the DNY as shown in Table 1-10 below.

TABLE 1-10

MSCID Table Record Information Indicating "Service Denied" for the #TOW Example Service

| MSC Field | Value for field |
|---|---|
| Reference | TOWlocate |
| Market ID | default |
| Switch ID | default |
| Next Table | DNY |
| Next Reference | NOtow |
| Routing Digits | NULL |

The above MSCID record would be reached if the SCP is unable to match the MSCID information included within a querying with any other MSCID record. In this case, the "Next Table" field would point to a record in the DNY table. All the MSC records for MSCIDs, which do not have the #TOW service, would be directed to a single record in the DNY table. The SCP then sends the Deny response back to the originating MSC, which plays a message or gives terminating call treatment to the caller. The DNY record would have the information shown in Table 1-11 following.

TABLE 1-11

DNY Table Record Information for the #TOW Example Service

| DNY Field | Value for Field |
|---|---|
| Reference | Notow |
| Deny Reason | A number indicating to the MSC that "service is not available in this area" |

Number translation in accordance with the present invention may be accomplished for example, by either order of precedence matching or digit editing within the UDP table or the CDP table. These methods are defined individually in the following paragraphs to show how they function, however, during an actual number translation, it is possible that both methods could be used on a specific dialed digits number. In one embodiment of the present invention, when number translation occurs within the MIN, there are differences in how digit editing is treated. Thus, the method as applied to the MIN table is described separately below.

In one example of the order of precedence method for UDP and CDP tables in accordance with the present invention, a dialed number is received by the SCP and sent to the UDP translation table to receive its number translation for routine. Within the UDP table, a search is done to locate the dialed number within the "dd_lower" and "dd_upper" fields of the records within the translation table based on the following rules of precedences:

1. Exact match: A check is made for an exact match between the dialed number and the "dd_lower" and the "dd_upper" fields of this table. Upon exact matching, the "Routing Digits" are captured from this record and all further attempts to match in this table cease.
2. Range match: If no exact match is found as stated in Rule 1 above, the SCP looks for a range match in which the dialed digits fall within the bounds as set by "dd_lower" and "dd_upper." Upon matching this range of dialed digits, the "Routing Digits" are captured from this record and all further attempts to match in this table cease.
3. Six-digit prefix match: If no match is found in either Rules 1 or 2 above and a six-digit prefix pattern has been provisioned in the "dd_lower" field that matches exactly the first six (leftmost) digits of the dialed number, the "Routing Digits " field is captured. All further attempts to match in this table cease.
4. Five-digit prefix match: If no match is found under Rules 1 through 3 above and a five-digit prefix pattern has been provisioned in the "dd_lower" field that matches exactly the first five (leftmost) digits of the dialed number, the "Routing Digits" field is captured. All further attempts to match in this table cease.
5. Four-digit prefix match: If no match is found under Rules 1 through 4 above and a four-digit prefix pattern has been provisioned in the "dd_lower" field that matches exactly the first four (leftmost) digits of the dialed number, the "Routing Digits" field is captured. All further attempts to match in this table cease.
6. Three-digit prefix match: If no match is found under Rules 1 through 5 above and a three-digit prefix pattern has been provisioned in the "dd_lower" field that matches exactly the first three (leftmost) digits of the dialed number, the "Routing Digits" field is captured. All further attempts to match in this table cease.
7. Default match: If no match is found under Rules 1 through 6 above and assuming that a default range has been provisioned, the "Routing Digits" field of this default record is captured. All further attempts to match in this table cease.
8. No match nor default: If no match nor default (Rules 1 through 7 above) is found, the "Routing Digits" are assigned the value of the dialed digits and all further attempts to match in this table cease.

Upon satisfying any of the precedence-matching Rules 1 through 7, the SCP examines the "Next Table" and "Next Reference" fields within the table for non-null entries. If entries are found, the entire transaction is forwarded to the named table for further translation processing. At the conclusion of all table traversals, the "Routing Digits" information is returned to the origination MSC for final routing. It should be noted that the above eight rules and other rules discussed herein are intended as examples and that the translation method of the present invention is intended for use in conjunction with other rules which may be better suited for a particular embodiment.

Examples of order of precedence matching within the UDP and CDP tables in accordance with the present invention are illustrated below in Table 1-12.

TABLE 1-12

Order of Precedence within UDP and CDP Tables

| Precedence Rule | dd_lower Field | dd_upper Field | Dialed Digits That Satisfy Rule |
|---|---|---|---|
| Exact Match | 0115417234 | 0115417234 | 0115417234 |
| Range Match | 015417000 | 0115417999 | 0115417359 |
| Six Digit Prefix Pattern | P011541??? | | 0115416666 |
| Five-Digit Prefix Pattern | P011554???? | | 0115425555 |
| Four-Digit Prefix Pattern | P0115????? | | 0115678999 |
| Three-Digit Prefix Pattern | P011?????? | | 0112345678 |
| Default | Default | Default | 7325551212 |

In one example of digit editing for UDP and CDP tables in accordance with the present invention, a dialed number is received by the SCP and sent to the UDP translation table for route. At this point, the SCP looks for a match. When the match is found, the routing digits field is checked for the actual number that needs to be returned to the MSC. In one embodiment, the route digits field may consist of 1–24 digits in the range of 0 through 9. In another embodiment, the route digits field may be a mixture of digits (0–9) and lowercase letters (a–z). All lowercase letters should be replaced with the corresponding dialed digits received within the query. In another embodiment, an "R" may be used to denote that the dialed digits should be reused. Examples of digit editing within the UDP and CDP tables are illustrated below in Table 1-13.

TABLE 1-13

Digit Editing within UDP or CDP Table

| Dialed Digits Field | Route Digits Field | Actual Routing Number Returned 10 MSC |
|---|---|---|
| #7298 | 908870dcba Where: a = 8, b = 9, c = 2, d = 7 | 9088707298 |
| #4567 | 908949dcba 908a0bdcba Where: a - 7, b = 6, c = 5, d = 4 | 9089494567 9087064567 |
| 2035551212 | R_ | 2035551212 |

One example of number translation within a MIN table in accordance with the present invention allows slightly different order of precedence rules because it allows the following character representations:

digits 0–9 nine digits (0–9) and one "?" character eight digits (0–9) and two "?" characters seven digits (0–9) and three "?" characters six digits (0–9) followed by four "?" characters three digits (0–9) followed by seven "?" characters default Examples of order of precedence for the MIN table are illustrated belong in Table 1-14.

TABLE 1-14

Order of Precedence for MIN Table

| — | Dialed Digits | MIN Number Field |
|---|---|---|
| Exact Match | 9083037234 | 9083037234 |
| 9-digit Match | 9083037234 | 908303723? |
| 8-digit Match | 9083037234 | 90830372?? |
| 7-digit Match | 9083037234 | 9083037??? |
| 6-digit Match | 9083037234 | 908303???? |
| 3-digit Match | 9083037234 | 908??????? |

The implementation of service logic in an SCP in accordance with the present intention relies on at least two concepts:

1. Values are entered in the routing digits fields of records within the translation tables of the SCP to reroute dialed numbers to other destinations.

2. The ability to "traverse" or deterministically move from translation table to translation table is supported by other provisionable values in records of tables within the translation database. This multiple table search capability enables matching on multiple variables within an OriginationRequest(INVOKE) query.

In performing any dialed number translation, the SCP exercises some form of table traversal logic. In the #TRAFFIC and #TOW examples, which detail subscriber services that employ multiple table traversal, the specifics of which table should be traversed next (if any) is specified as data that is provisioned in records within various tables. In accordance with one embodiment of the present invention, the following rules have been established in the design of the SCP that govern how these table traversals are performed.

1. If the "next_tbl" (Next Table) and "next_ref" (Next Reference) fields contain values the "next_tbl" and "next_ref" field values are used to "traverse" the table specified by "next_tbl" and continue the number translation process in that table. The number translation process examines the record(s) that contain the reference value, "next_ref," for matches on other fields, depending on the specific table, such as:

Mobile Identification Number

Dialed digits (Custom dialing plans)

Mobile Switching Center Identification

2. If the "route_digits" (Routing Digits) field contains a value, this value of the routing telephone number is carried forward into the next table traversed (if one is specified). This routing telephone number is processed in accordance with rules outlined in greater detail below. This value of these routing digits carried forward remains in effect for the duration of this specific translation until it is replaced by a new value of route digits encountered in a subsequent matching record in a traversed table.

3. If the "route_digits" (Routing Digits) field in the current table traversed does not contain a value, the value of the routing telephone number from a previously traversed table is used.

4. If there is no "route_digits" value or routing telephone number from any previous table traversal, the original cellular subscriber dialed digits are returned to the MSC as the routing telephone number.

If the "next_tbl" field in the matched record in a table does not contain a legitimate table name, treat this table as the final table to be searched and proceed with translating the routing number in accordance with the rules outlined below.

In the following paragraphs, these rules are applied to database table excerpts on behalf of implementing the #TRAFFIC and #TOW example services described previously. Recall that in these two examples, OriginationRequest (INVOKE) messages begin by querying the UDP table. Table 1-15 illustrates an example of a UDP table with records for the #TRAFFIC and #TOW example services.

TABLE 1-15

UDP Table With Records for #TRAFFIC and #TOW Example Services

| Digits Dialed Lower (dd_lower) | Digits Dialed Upper (dd_upper) | Next Table (next_tbl) | Next Reference (next_ref) | Routing Digits (route_digits) |
|---|---|---|---|---|
| . | . | . | . | . |
| . | . | . | . | . |
| . | . | . | . | . |
| #872342 | #872342 | MSCID | traff | NULL |
| #869 | #869 | MSCID | TOWlocate | NULL |
| . | . | . | . | . |
| . | . | . | . | . |

The segment of the UDP table illustrated in Table 1-15 includes one record for each service. Each of these records matches the dialed digit strings ("#8723342" and "#869") that correspond to the specific service requested. Observe that the "next_tbl" field in both records was provisioned with "MSCID." MISCID is the name of the table that contains additional translation records for these services. Also note that "next_ref" is provisioned with different values ("traff" and "TOWlocate"), which correspond to the two different services. In this case, applying the table traversal rules, the number translation proceeds to examine the MSCID table by respectively referencing records with "traff" and "TOWlocate" in their "next_ref" fields.

Table 1-16 illustrates an example of an MSCID table with records for the #TRAFFIC and #TOW example services.

TABLE 1-16

MSCID Table Records for #TRAFFIC and #TOW Example Services

| Reference Index (reference) | Market ID (market_id) | MSCID (switch_num) | Next Table (next_tbl) | Next Reference (next_ref) | Routing Digits (route_digits) |
|---|---|---|---|---|---|
| . | . | . | . | . | . |
| . | . | . | . | . | . |
| . | . | . | . | . | . |
| traff | 1234 | 111 | NULL | NULL | 2035551111 |
| traff | 1234 | 222 | NULL | NULL | 2035552222 |
| traff | 1234 | 333 | NULL | NULL | 2035553333 |
| traff | 1234 | 444 | NULL | NULL | 2035554444 |

TABLE 1-16-continued

MSCID Table Records for #TRAFFIC and #TOW Example Services

| Reference Index (reference) | Market ID (market_id) | MSCID (switch_num) | Next Table (next_tbl) | Next Reference (next_ref) | Routing Digits (route_digits) |
|---|---|---|---|---|---|
| traff | default | default | DNY | notraff | NULL |
| . | . | . | . | . | . |
| . | . | . | . | . | . |
| . | . | . | . | . | . |
| TOWlocate | 136 | 4 | NULL | NULL | 4145552869 |
| TOWlocate | default | default | DNY | Notow | NULL |
| . | . | . | . | . | . |
| . | . | . | . | . | . |
| . | . | . | . | . | . |

Referring to Table 1-16, observe the references associated with the records for each of the two example services. Considering the #TRAFFIC service, notice that there are five records provisioned that are associated with the traff reference. Four of these result in the return of four unique values (2035551111, 2035552222, 2035553333, and 2035554444) for "route_digits," while the last record matches (precedence rules apply) only to those OriginationRequest(INVOKE) queries that do not match the specific values for "market_id" and "switch_num." The default match record for #TRAFFIC service in the MSCID table specifies a "next_tbl" value of "DNY." The function of the DNY table will be discussed in greater detail below.

Similarly, #TOW service (as illustrated in Table 1-16) has two records provisioned in the MSCID table associated with the TOWlocate reference. The first record only matches a value of "136" for "market_id" and "4" for "switch_num" and routes the call to "4145552869." The default match record for #TOW service in the MSCID table specifies a "next_tbl" value of "DNY." The function of the DNY table will be discussed in greater detail below.

Table 1-17 illustrates an example of a DNY table with records for the #TRAFFIC and #TOW example services.

TABLE 1-17

DNY Table Records for #TRAFFIC and #TOW Example Services

| Reference Index (reference) | Deny Reason (deny_reason) | Announcement List (announ_list) |
|---|---|---|
| . | . | . |
| . | . | . |
| . | . | . |
| notraff | 3 | 15D18B |
| NOtow | 3 | 15D07901 |
| . | . | . |
| . | . | . |
| . | . | . |

The DNY table may be reached if either the #TRAFFIC or #TOW service is invoked by a subscriber who is being "served" by an MSC within a market not provisioned in the records in The MSCID table. As noted previously, these calls traverse through to the DNY table and result in a provisioned deny reason being sent to the MSC, along with a provisioned list of announcements that the MSCID plays to the cellular subscriber indicating why these services are not provided to them.

Figure 3:
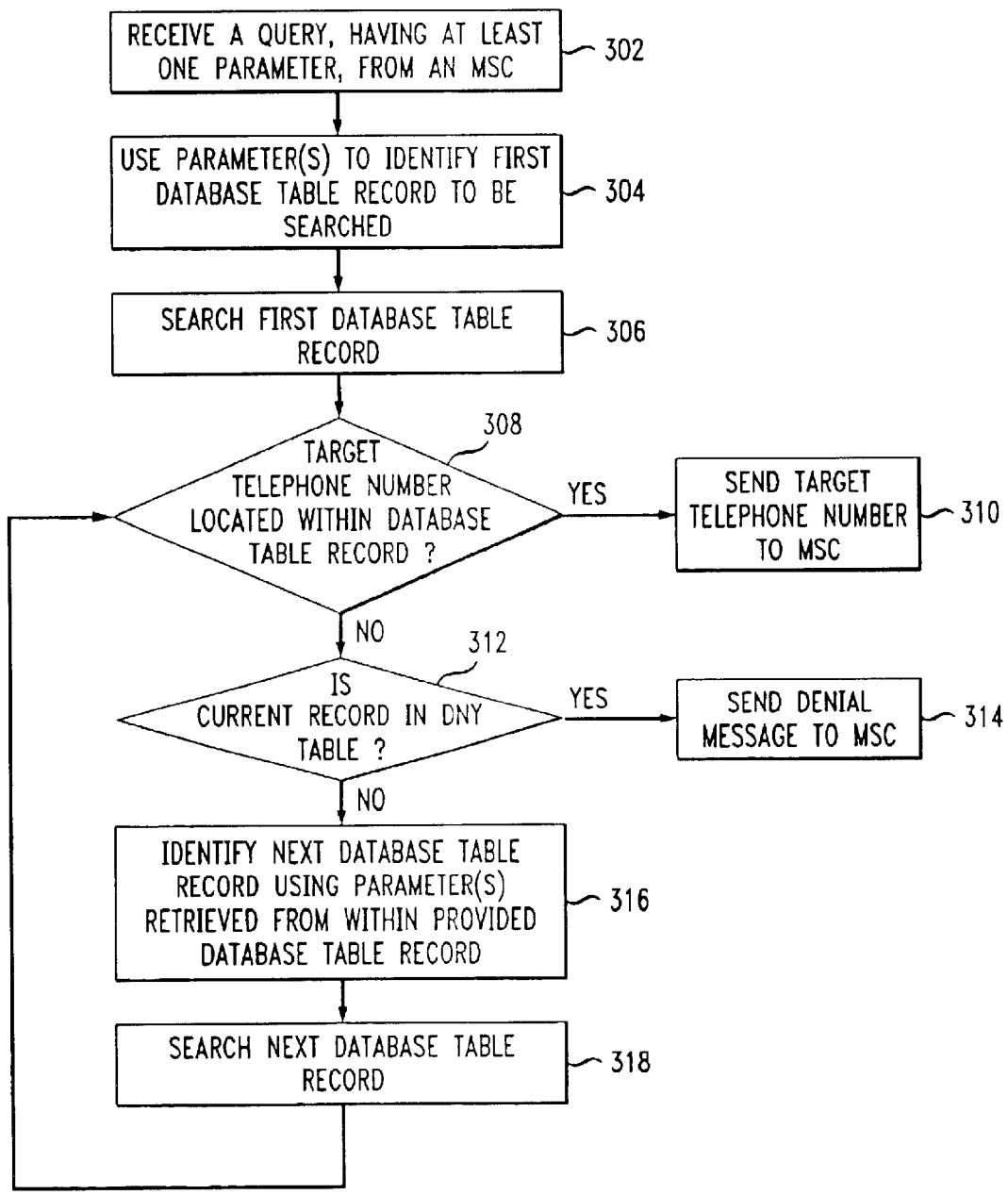
FIG. 3 illustrates a flow chart with steps for translating a dialed number to a target telephone number in accordance with an embodiment of the present invention.

FIG. 3 illustrates a flow chart with steps for translating a dialed number to a target telephone number in accordance with an embodiment of the present invention. These steps may be implemented, for example, as a computer program or as computer hardware using well-known signal processing techniques. If implemented in software, the computer program instructions are stored in computer readable memory, such as Read-Only Memory (ROM), Random Access Memory (RAM), magnetic disk (e.g., 3.5" diskette or hard drive), optical disk (e.g., CD-ROM) and so forth. In accordance with one embodiment of the present invention, the computer program instructions are included within a translation module 206 and executed by processor 202 within an SCP 110.

In step 302, the SCP receives a query from an MSC whose dialing plan indicates a subscriber has dialed a number which requires translation to a target telephone number. The query includes one or more variables (parameters) such as the digits dialed by the subscriber, the MIN for a wireless telephone, and the MSCID. In step 304, the SCP uses the parameter(s) to identify the first database table record which should be searched. In step 306, the SCP searches the database table record identified in step 304. In step 308, the SCP determines whether the desired target telephone number is located within the first database table record.

If, in step 308, the target telephone number is located within the first database table record, the SCP proceeds to step 310 and sends the target telephone number to the MSC. If, in step 308, the target telephone number is not located within the current database table record, the SCP proceeds to step 312 and determines whether the current table is the DNY table.

If, in step 312, the current table is the DNY table, the SCP proceeds to step 314 and sends an appropriate denial message to the MSC. This denial message may be, for example, a recorded message or instructions for the MSC to route the call using the originally dialed digits.

If, in step 312, the SCP determines the current table is not the DNY table, the SCP proceeds to step 316 and uses parameter(s) from within the first database table record to identify the next database table record which should be searched. The SCP then proceeds to step 318, searches the next database table record, and returns to step 308.

After completing the steps illustrated in FIG. 3, the SCP has queried a set of database tables to identify a target telephone number (or another appropriate response) which corresponds to a dialed number and sent the target telephone number (or the response) to a requesting MSC. If the service implemented by the above steps should require modification, the process of modifying the service entails adding or deleting records within tables included within the database. The software which implements the above described steps would not need to be modified, tested and debugged.

Although several embodiments are specifically illustrated herein, it will be appreciated that modifications and variations of the present invention are covered by the above teachings and within the purview of the appended claims without departing from the spirit and intended scope of the invention.

What is claimed is:

1. A method for translating a first parameter to a second parameter using a database comprising at least one table, wherein said at least one table includes at least one record, the method comprising the steps of:

receiving a query corresponding to the first parameter, said query including a third parameter;

searching a first database table record to locate the second parameter, said first database table record being identified using said third parameter; and searching a second database table record to locate the second parameter if the second parameter is not located within said first database table record, said second database table record being identified using a fourth parameter located within said first database table record.

2. The method of claim 1, further comprising the step of:

sending the second parameter to a device from which said query originated.

3. The method of claim 2, wherein the first parameter is a number dialed using a telephone;

wherein the second parameter is a target telephone number; and wherein said device is a switch adapted to be connected to a communications network.

4. A method for translating a first parameter to a second parameter using a database comprising at least one table, wherein said at least one table includes at least one record, the method comprising the steps of:

sending a query from a device to the database, said query including third parameter;

searching a first database table record to locate the second parameter, said first database table record being identified using said third parameter;

searching a second database table record to locate the second parameter if the second parameter is not located within said first database table record, said second database table record being identified using a fourth parameter located within said first database table record; and sending the second parameter from the database to said device.

5. The method of claim 4, wherein the first parameter is a number dialed using a telephone;

wherein the second parameter is a target telephone number; and wherein said device is a switch adapted to be connected to a communications network.

6. A computer-readable medium whose contents cause a computer system to translate a first parameter to a second parameter using a database comprising at least one table, wherein said at least one table includes at least one record, the computer-readable medium performing the steps of:

receiving a query corresponding to the first parameter, said query including a third parameter;

searching a first database table record to locate the second parameter, said first database table record being identified using said third parameter; and searching a second database table record to locate the second parameter if the second parameter is not located within said first database table record, said second database table record being identified using a fourth parameter located within said first database table record.

7. The computer-readable medium of claim 6, further performing the step of:

sending the second parameter to a device from which said query originated.

8. The computer-readable medium of claim 7, wherein the first parameter is a number dialed using a telephone;

wherein the second parameter is a target telephone number; and wherein said device is a switch adapted to be connected to a communications network.

9. An apparatus for translating a first parameter to a second parameter, comprising:

a processor;

a computer readable memory segment adapted to be connected to said processor;

a database adapted to be connected to said processor, said database including at least one table, wherein said at least one table includes at least one record; and a translation module included within said computer readable memory segment, said translation module including computer program code segments which, when executed by said processor, implement the following steps:

receiving a query corresponding to the first parameter, said query including a third parameter;

searching a first database table record to locate the second parameter, said first database table record being identified using said third parameter; and searching a second database table record to locate the second parameter if the second parameter is not located within said first database table record, said second database table record being identified using a fourth parameter located within said first database table record.

10. The apparatus of claim 9, wherein said computer program code segments within said translation module further implement the step of:

sending the second parameter to a device from which said query originated.

* * * * *